(12) United States Patent
Yoshida

(10) Patent No.: US 6,854,790 B2
(45) Date of Patent: Feb. 15, 2005

(54) VEHICLE FRONT PILLAR

(75) Inventor: Suguru Yoshida, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 8 days.

(21) Appl. No.: 09/725,447

(22) Filed: Nov. 30, 2000

(65) Prior Publication Data

US 2001/0040392 A1 Nov. 15, 2001

(30) Foreign Application Priority Data

Nov. 30, 1999 (JP) .......................................... 11-340237
Nov. 30, 1999 (JP) .......................................... 11-340262

(51) Int. Cl.[7] .............................................. B62D 25/00
(52) U.S. Cl. .............................. 296/187.05; 296/193.06
(58) Field of Search ....................... 296/203.02, 203.03, 296/205, 30, 187.03, 187.05, 193.06

(56) References Cited

U.S. PATENT DOCUMENTS 5,042,872 A * 8/1991 Yoshii .................... 296/203.02
5,810,428 A * 9/1998 Maki ...................... 296/203.02
5,941,597 A * 8/1999 Horiuchi et al. ..... 296/203.03 X

FOREIGN PATENT DOCUMENTS

| JP | 9-039833 | 2/1997 |
| JP | 09-039833 | 6/1997 |
| WO | WO 99/62755 | 12/1999 |

* cited by examiner

Primary Examiner—Joseph D. Pape
(74) Attorney, Agent, or Firm—Arent Fox PLLC

(57) ABSTRACT

In a vehicle front pillar including inner and outer frame members joined into a substantial tubular shape, a fore portion of the inner frame member is oriented toward the front of the vehicle and has at least one bent portion formed thereon so as to serve as a shock absorbing section. Rear portion of the inner frame member is oriented toward the back of the vehicle and has a reinforcing member of a closed sectional structure attached thereto so as to serve as a high-rigidity section. The reinforcing member may have a circular or rectangular cross-sectional shape.

19 Claims, 13 Drawing Sheets

FRONT ⇔ REAR

VEHICLE FRONT PILLAR

BACKGROUND OF THE INVENTION

1. Field of the Invention

The present invention relates to an improved vehicle front pillar.

2. Description of the Related Art

Vehicle front pillars constitute a very important part of a vehicle body which requires high rigidity. When some obstacle or other external object collides with one or both of the front pillars, the external object is often subjected to a great impact. If the rigidity of the front pillars is reduced to give preference to protection of a possible colliding external object, however, durability of the entire vehicle would be more or less sacrificed. Thus, there has been a demand for more sophisticated vehicle front pillars which can sufficiently alleviate an impact on a possible colliding external object while still retaining their necessary rigidity. Example of such vehicle front pillars giving special attention to alleviation of an impact on a possible obstacle or external object is known, for example, from Japanese Patent Laid-open Publication to No. HEI-9-39833.

In the front pillar disclosed in the HEI-9-39833 publication, inner and outer frame members are joined together to form a pillar body of a substantial tubular shape. Here, a low-rigidity shock absorbing panel is attached to the fore surface of the outer frame member, and a resin garnish is attached to the fore surface of the shock absorbing panel. In case an external object collides with the fore portion of the front pillar, the resin garnish and shock absorbing panel are both caused to deform plastically with a substantial cushion effect, to thereby alleviate the impact on the external object.

As noted above, the known front pillar only includes the shock absorbing panel on the pillar body. Namely, in the known front pillar, the impact on an external object colliding with the front pillar can be absorbed merely by the plastic deformation of the shock absorbing panel, and there is no means for absorbing the impact force after the external object reaches the pillar body. Thus, there is still great room for further improvement to sufficiently alleviate the impact on the external object. Namely, although the pillar body affords the necessary rigidity of the known front pillar, it is not designed to alleviate, by itself, the colliding impact on the external object.

SUMMARY OF THE INVENTION

It is therefore an object of the present invention to provide a vehicle front pillar which can sufficiently alleviate an impact on a colliding external object while still retaining its necessary rigidity.

In order to accomplish the above-mentioned object, the present invention provides a vehicle front pillar of a substantial tubular shape, which comprises: a fore half portion oriented toward a front (i.e., in a forward direction) of the vehicle and having at least one bent portion formed thereon so as to serve as a shock absorbing section of the vehicle front pillar; and a rear half portion oriented toward a back (i.e., in a rearward direction) of the vehicle and having a reinforcing member of a closed sectional structure attached thereto so as to serve as a high-rigidity section of the vehicle front pillar.

In the present invention, the fore half portion of the front pillar has at least one bent portion to serve as a shock absorbing section of the vehicle front pillar. Thus, in case an obstacle or external object collides with the front pillar, the fore half portion of the front pillar can be deformed, with a substantial cushion effect, with the bent portion further bent by the colliding impact force. Such cushioning deformation of the fore half portion can effectively absorb the colliding impact and thereby alleviate the impact on the external object. Further, with the reinforcing member of the closed sectional structure additionally attached to the rear portion of the front pillar, the rear half portion can serve as a high-rigidity section for retaining the necessary rigidity of the front pillar. Thus, in case an obstacle or external object collides against with the front pillar, the rear half portion can be prevented from being deformed by the colliding impact and thereby can retain the shape of the passenger compartment. The reinforcing member may have a circular or rectangular cross-sectional shape.

The present invention also provides a vehicle front pillar of a substantial tubular shape which comprises: a fore half portion oriented toward the front of the vehicle and formed into a thin wall structure so as to serve as a shock absorbing section of the vehicle front pillar for absorbing an impact force applied from ahead of the vehicle; and a rear half portion oriented toward the back of the vehicle and formed into a thick-wall closed sectional structure so as to serve as a high-rigidity section of the vehicle front pillar.

Namely, in the present invention, the fore half portion of the front pillar is formed into a thin wall structure so as serve as a shock absorbing section of the vehicle front pillar. Thus, when an obstacle or external object collides against with the front pillar, the fore half portion of the front pillar can be deformed, with a substantial cushion effect, with the thin wall structure bent by the colliding impact force. Such cushioning deformation of the fore half portion can effectively absorb the colliding impact and thereby alleviate the impact on the external object. Further, by forming the rear portion of the front pillar formed into a thick-wall closed sectional structure, the rear portion can serve as a high-rigidity section of the vehicle front pillar. Thus, in case an obstacle or external object collides against with the front pillar, the rear half portion can be prevented from being deformed by the colliding impact and thereby can retain the shape of the passenger compartment.

The present invention also provides a vehicle front pillar of a substantial tubular shape which comprises: inner and outer frame members, the inner frame member including: a fore half portion oriented toward the front of the vehicle and formed into a thin wall structure so as to serve as a shock absorbing section of the vehicle front pillar for absorbing an impact force applied from ahead of the vehicle; and a rear half portion oriented toward the back of the vehicle and formed into a thick-wall closed sectional structure so as to serve as a high-rigidity section of the vehicle front pillar; and an interior reinforcing stiffener fixed between the inner and outer frame members and extending between fore and rear ends of the inner and outer frame members, the stiffener having at least one bent portion to provide an additional shock absorbing section.

BRIEF DESCRIPTION OF THE DRAWINGS

For better understanding of the object and other features of the present invention, its preferred embodiments will be described in greater detail hereinbelow with reference to the accompanying drawings, in which.

DETAILED DESCRIPTION OF THE PREFERRED EMBODIMENTS

Note that the terms "fore" or "front", "rear" or "back", "left", "right", "upper" and "lower" are used herein to refer to various directions as viewed from a driver or human operator of the vehicle sitting behind a steering wheel.

Figure 1:
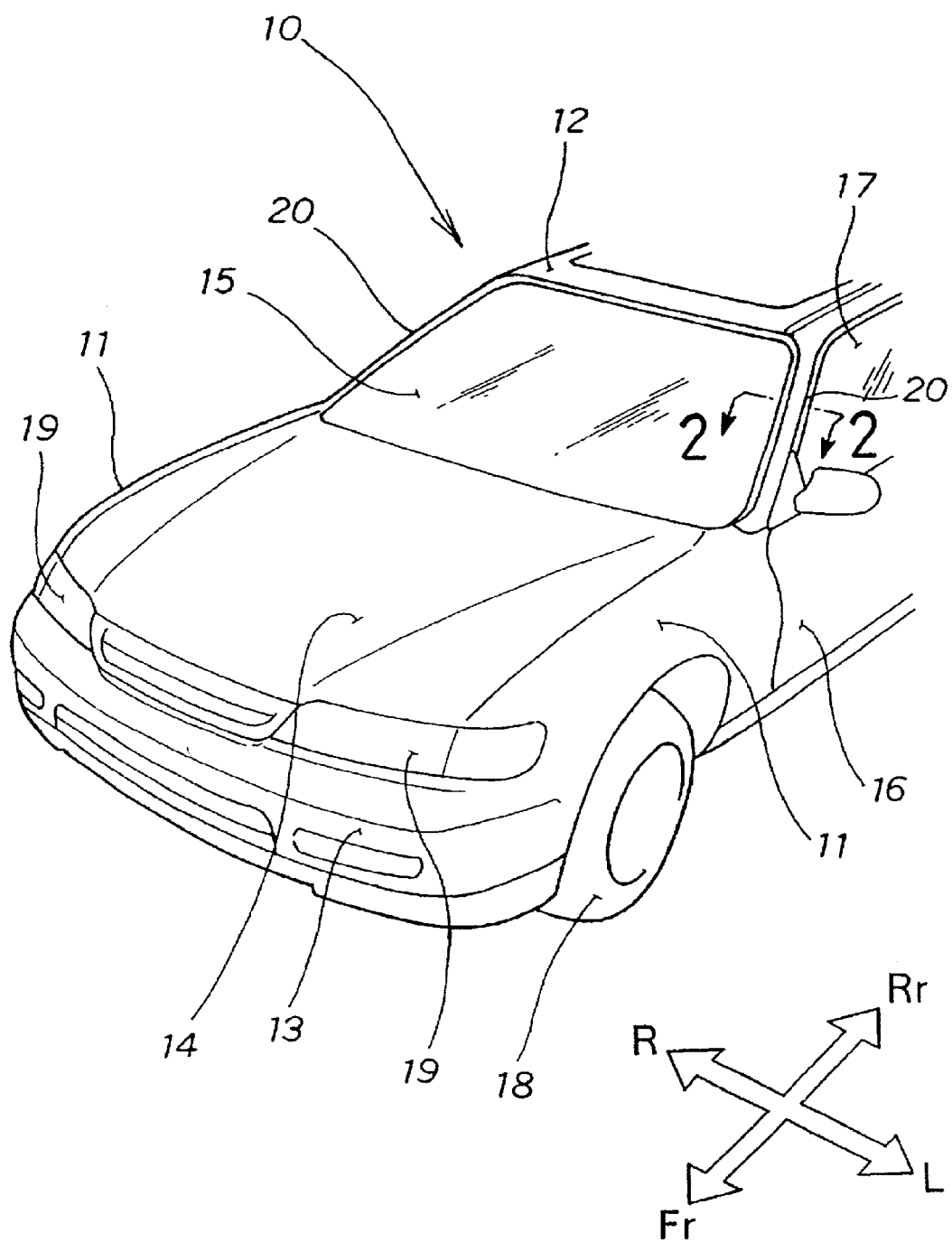
FIG. 1 is a schematic perspective view showing an automotive vehicle including front pillars in accordance with a first embodiment of the present invention.

FIG. 1 is a schematic perspective view showing an automotive vehicle 10 including a front pillar structure in accordance with a first embodiment of the present invention, which particularly shows left and right front pillars 20 constituting an important part of a body of the vehicle 10. In the drawings, reference numerals "Fr", "Rr", "L" and "R" represents a fore direction, rear direction, leftward direction and rightward direction, respectively, and "CL" represents an inward direction, i.e. a direction toward a longitudinal center line of the vehicle body. Further, in FIG. 1, reference numeral "11" represents a front fender, "12" a vehicle roof, "13" a front bumper, "14" a bonnet, "15" a front windshield glass, "16" a door, "17" a door glass, "18" a front road wheel and "19" a headlight. Although detailed construction of the left front pillar will be primarily described hereinbelow in relation to several preferred embodiments, it should be appreciated that the right front pillar is constructed identically to the left front pillar.

Figure 2:
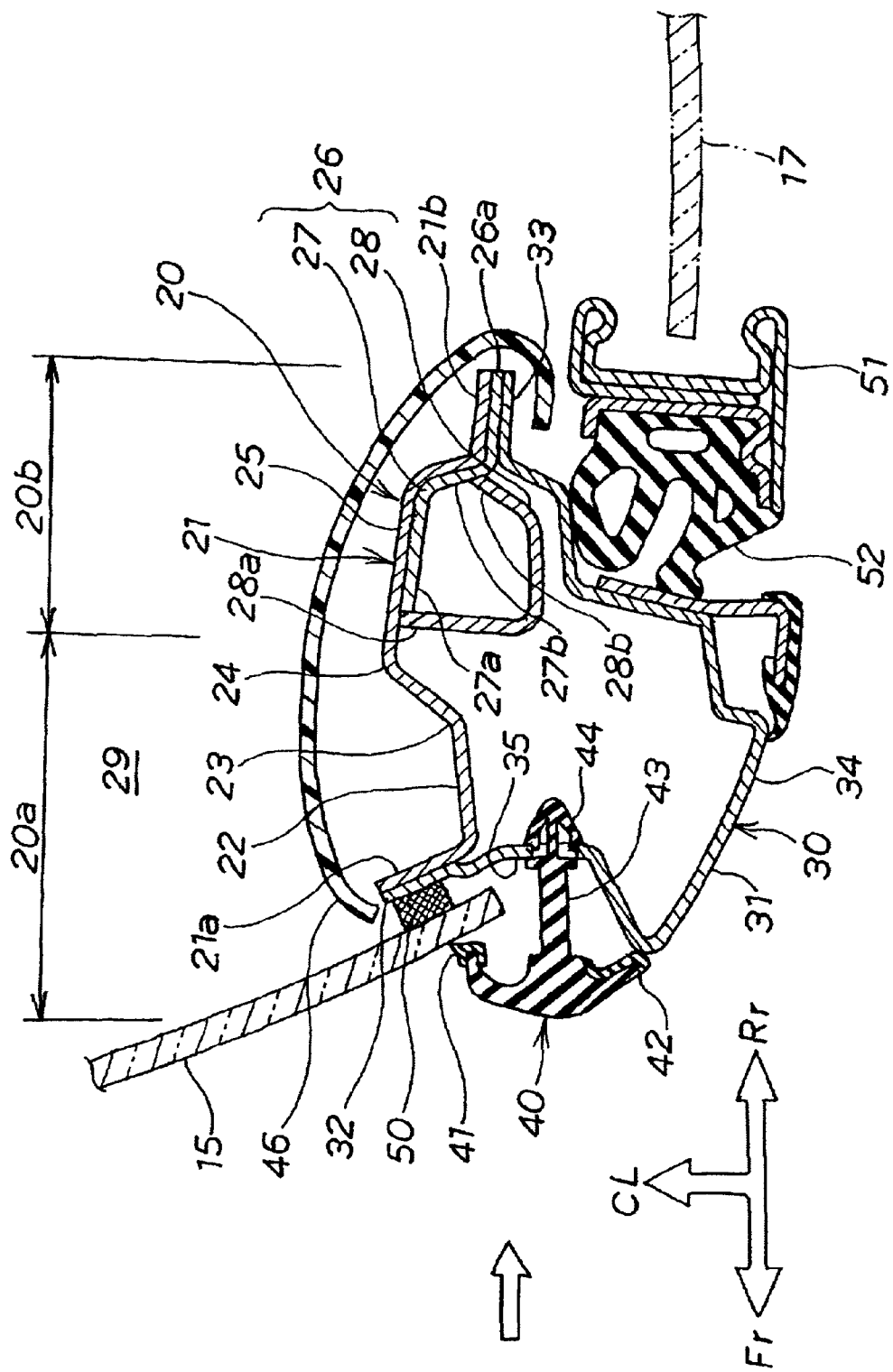
FIG. 2 is a cross-sectional view of one of the front pillars (left front pillar) taken along the lines 2—2 of FIG. 1.

FIG. 2 is a cross-sectional view of the left front pillar 20 taken along the lines 2—2 of FIG. 1. The front pillar 20 includes inner and outer frame members 21 and 30 joined together into a substantial tubular shape. Fore half portion of the front pillar 20 is oriented in a forward direction (i.e., toward the front) of the vehicle 10, while a rear half portion of the front pillar 20 is oriented in a rearward direction (i.e., toward the back) of the vehicle 10. As shown, a fore portion 22 of the inner frame member 21 has first and second bent portions 23 and 24 that constitute a shock absorbing section 20a of the front pillar 20, and a rear portion 25 of the inner frame member 21 is reinforced with a reinforcing member 26 of a closed cross-sectional shape, so as to serve as a high-rigidity section 20b that affords the necessary rigidity or mechanical strength of the front pillar 20.

The inner frame member 21 of the front pillar 20 projects toward a passenger compartment 29 of the vehicle 10 and has a fore flange portion 21a lying substantially parallel to the front windshield glass 15. The above-mentioned first and second bent portions 23 and 24 of the inner frame member 21 are formed by curving or bulging the fore portion 22, extending rearward from the fore flange portion 21a, outwardly away from the passenger compartment 29. The rear portion 25 of the inner frame member 21, extending rearward from the rear end of the fore portion 22 and reinforced with the reinforcing member 26, has a rear flange portion 21b lying from the rear end of the rear portion 25 substantially parallel to the door glass 17. It is preferred that the inner frame member 21 be formed by bending or extruding a metal material such as steel or aluminum alloy.

The above-mentioned reinforcing member 26 includes a first reinforcing plate 27 secured to the surface of the rear portion 25 of the inner frame member 21, and a second reinforcing plate 28 having its fore and rear ends 28a and 28b secured to the fore end 27a and middle portion 27b, respectively, of the first reinforcing plate 27. The first and second reinforcing plates 27 and 28, joined together in this manner, together form the closed cross-sectional shape as mentioned above. The reinforcing member 26 also has a rear flange portion 26a that is secured between the rear flange portion 21b of the inner frame member 21 and a rear flange portion 33 (to be described later) of the outer frame member 30. It is preferable that each of the first and second reinforcing plates 27 and 28 have a greater thickness than the inner and outer frame members 21 and 30.

Namely, with the first and second bent portions 23 and 24, the fore half portion of the front pillar 20 can serve as the shock absorbing section 20a. Thus, in case an obstacle or external object collides with the front pillar 20 from ahead of the vehicle 10 as arrowed in FIG. 2, the inner-frame fore portion 22 can be deformed, with a substantial cushion effect, with the first and second bent portions 23 and 24, constituting the shock absorbing section 20a on the fore portion 22 of the front pillar 20, further bent by the colliding impact. Such cushioning deformation of the inner-frame fore portion 22 can effectively absorb the colliding impact force and thereby alleviate the impact on the external object.

Further, because the cushioning deformation of the fore portion 22 can be promoted by just forming the first and second bent portions 23 and 24 on the inner-frame fore portion 22 of the front pillar 20, the advantageous shock-absorbing front pillar 20 can be produced relatively easily.

Furthermore, with the reinforcing member 26 having the closed cross-sectional shape, the rear portion 25 of the inner frame member 21 can be reinforced to a sufficient degree and can serve as the high-rigidity section 20b. Thus, in case an obstacle or external object collides against with the front pillar 20, the rear portion 25 of the inner frame member 21 can be reliably prevented from being deformed by the colliding impact force and thereby retain the shape of the passenger compartment 29.

The outer frame member 30 has an outward bulge 31 remote from the passenger compartment 29. The outer frame member 30 also has a fore flange portion 32 extending from the fore end of the outward bulge 31 substantially parallel to the front windshield glass 15, and the above-mentioned rear flange portion 33 extending from the rear end of the outward bulge 31 substantially parallel to the door glass 17. The outer frame member 30 opens in the inward direction CL (i.e., toward the longitudinal center line of the vehicle body). The outward bulge 31 is curved relatively deeply to provide a bottom 34 facing the outside. The outward bulge 31 of the outer frame member 30 also has a fore portion 35 curved rearward for attachment thereto of a garnish 40.

The outer frame member 30 is fixed to the inner frame member 21 by joining its fore flange portion 32 to the fore flange portion 21a of the inner frame member 21 and joining its rear flange portion 33, via the flange portion 26a of the reinforcing member 26, to the rear flange portion 21b of the inner frame member 21. It is preferred that the outer frame member 30 as well be formed by bending or extruding a metal material such as steel or aluminum alloy.

The garnish 40 has an inner lip portion 41 abutted against the outer surface of the front windshield glass 15, an outer lip portion 42 abutted against the outer surface of the outward bulge 31, and a central fitting portion 43 having a plurality of clip portions (only one of which is shown in the figure) 44 that are snap-fitted through the fore portion 35 so as to mount the garnish 40 on the outward bulge 31. The garnish 40 thus mounted covers the fore portion 35 to enhance the appearance of the front pillar 20. The garnish 40 is preferably formed of resin, such as polyvinyl chloride, so that it can be easily deformed by a colliding impact applied from ahead of the vehicle 10.

In the illustrated example of FIG. 2, the inner surface of the inner frame member 21 facing the passenger compartment 29 is covered with an interior cover 46. The interior cover 46 can enhance the appearance of the passenger compartment 29 and also function as a protector for the front pillar 20. Thus, when an obstacle or external object collides against with the front pillar 20, the interior cover 46 can protect the rear portion 25 of the inner frame member 21 from being deformed by the colliding impact force and thereby retain the shape of the passenger compartment 29. Note that in FIG. 2, reference numeral 50 represents a sealant, 51 a door sash and 52 a weatherstrip.

Figure 3:
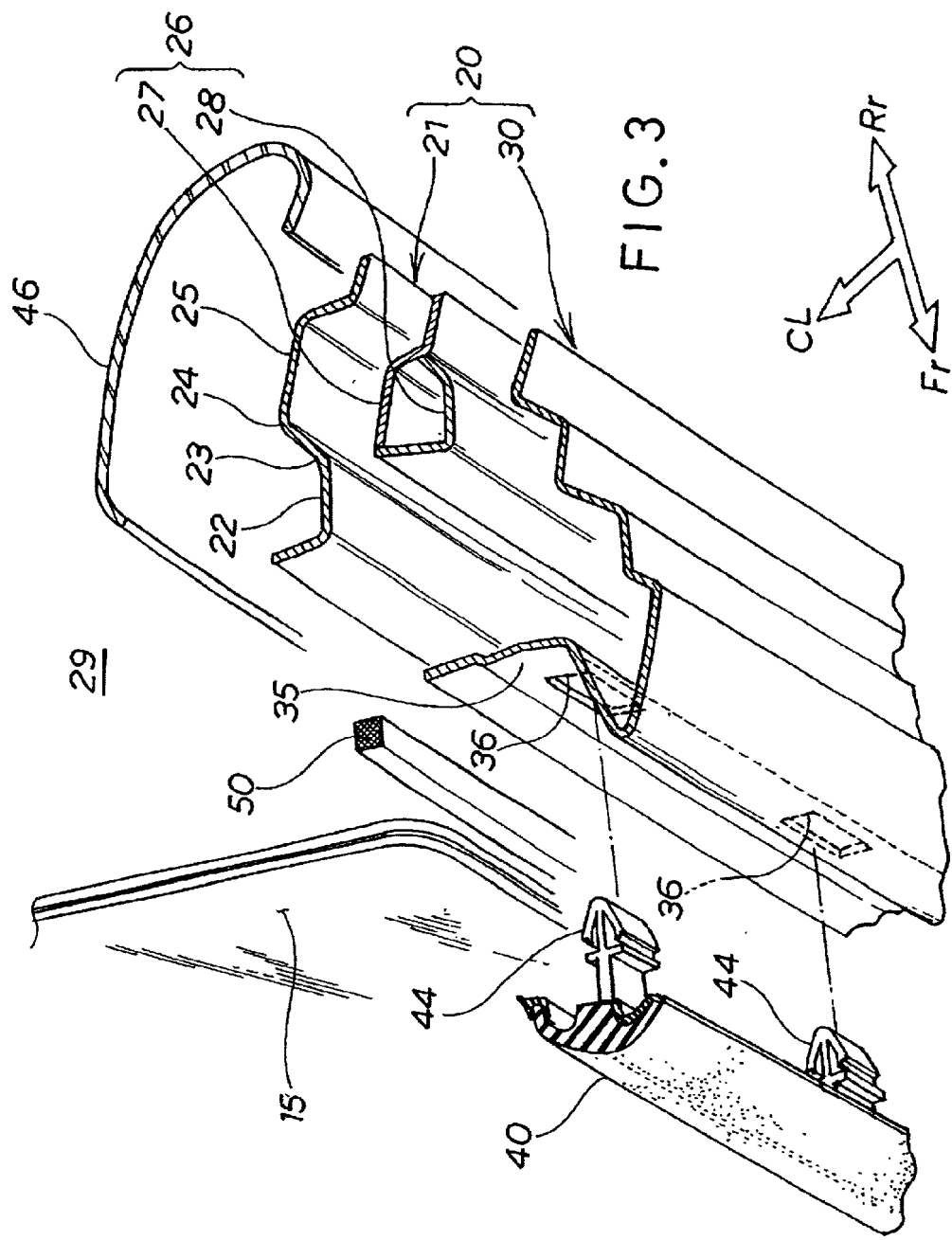
FIG. 3 is an exploded perspective view of the front pillar in accordance with the first embodiment of the present invention.

FIG. 3 is an exploded perspective view of the front pillar 20 in accordance with the first embodiment of the present invention. From the figure, it should be clear that the inner frame member 21 is an elongate member having the first and second bent portions 23 and 24 formed on the fore portion 22 and the reinforcing member 26 (i.e., a combination of the first and second reinforcing plates 27 and 28) is also an elongate member secured to the rear portion 25 of the inner frame member 21. FIG. 3 also shows a plurality of mounting holes 36 formed in the fore portion 35 of the outer frame member 30 at positions thereof corresponding to the clip portions 44 of the garnish 40.

Operation of the vehicle front pillar 20 will now be described with reference to FIGS. 4 and 5.

Figure 4A:
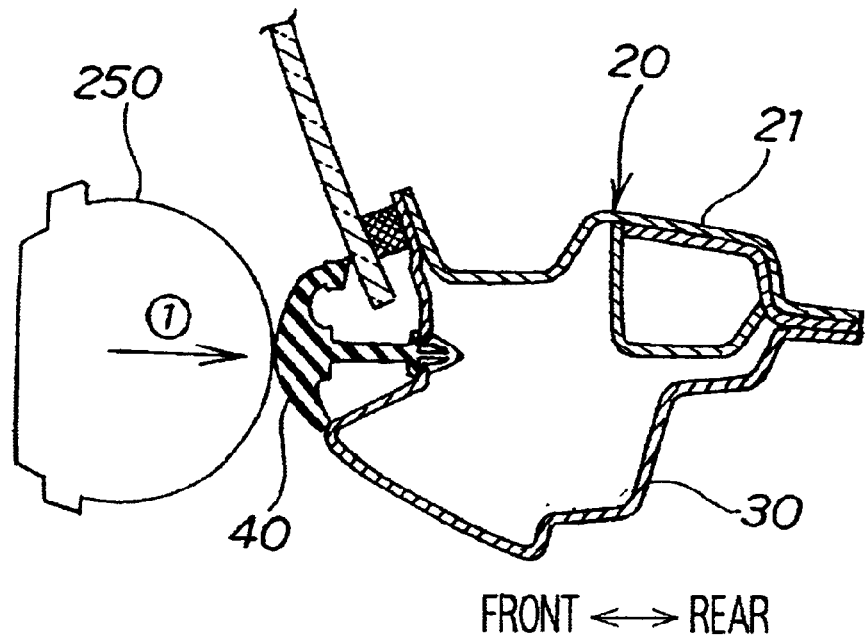
FIGS. 4A–4B and FIGS. 5A–5B are views explanatory of how the front pillar of the invention operates.
Figure 4B:
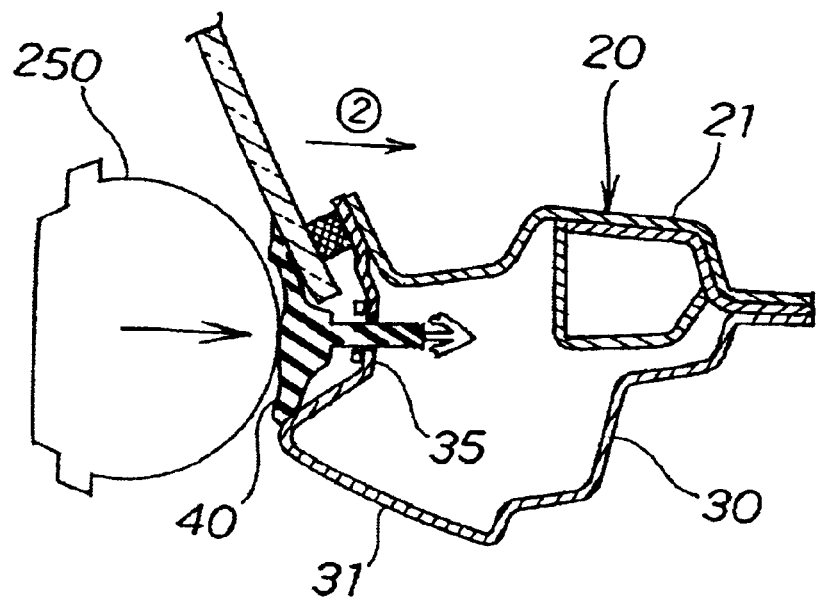
Figure 5A:
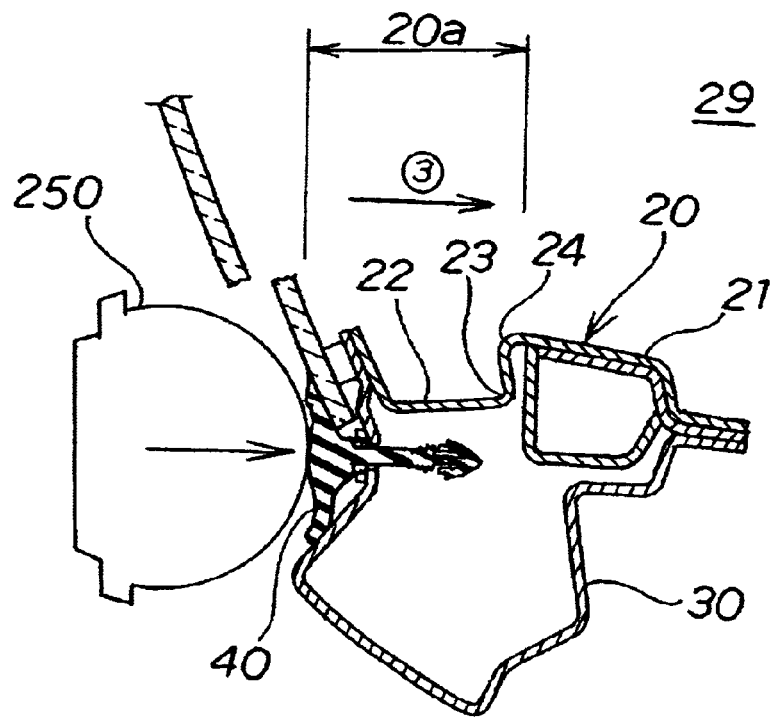
Figure 5B:
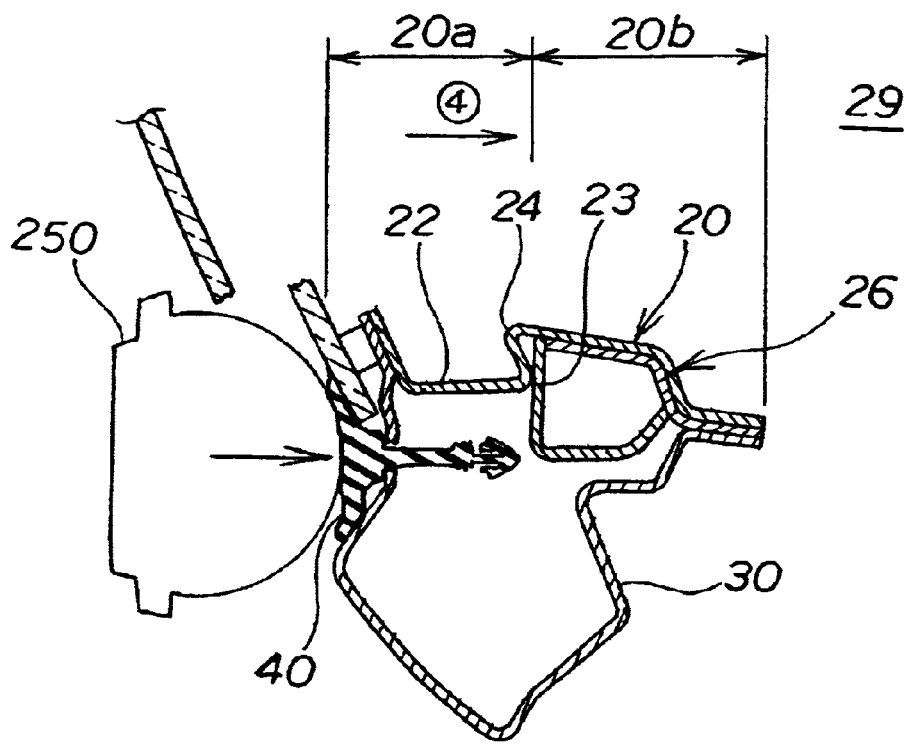

More specifically, FIG. 4A shows an obstacle or external object 250 colliding with the garnish 40 from ahead of the vehicle as denoted by arrow ①. FIG. 4B shows a next state of the collision, in which the garnish 40 having collided with the external object 250 is strongly pressed rearward and crushed by the external object 250, as denoted by arrow ②, so that the garnish 40 is forced into a recess defined by the fore portion 35. FIG. 5A shows a further next state of the collision, in which the first and second bent portions 23 and 24 of the inner-frame fore portion 22 are further bent by the colliding impact force so that the shock-absorbing section 20a of the front pillar 20 is deformed plastically toward the interior of the passenger compartment 29 as denoted by arrow ③. In a final state of the collision illustrated in FIG. 5B, the first and second bent portions 23 and 24 of the inner-frame fore portion 22 are even further bent and thus the shock-absorbing section 20a of the front pillar 20 is further deformed plastically toward the interior of the passenger compartment 29 as denoted by arrow ④.

By the above-described construction and operation, the front pillar 20 of the invention can sufficiently absorb the colliding impact force and thereby sufficiently alleviate the impact on the external object 250. In addition, the high-rigidity section 20b of the front pillar 20, which is reinforced with the reinforcing member 26 of the closed sectional structure, can still retain the necessary rigidity of the rear portion 25 of the inner frame member 21 despite the colliding impact force, and thus prevent unwanted deformation of the passenger compartment 29.

The following paragraphs describe second and third embodiments of the present invention, using the same reference numerals to represent the same elements as in the above-described first embodiment.

Figure 6:
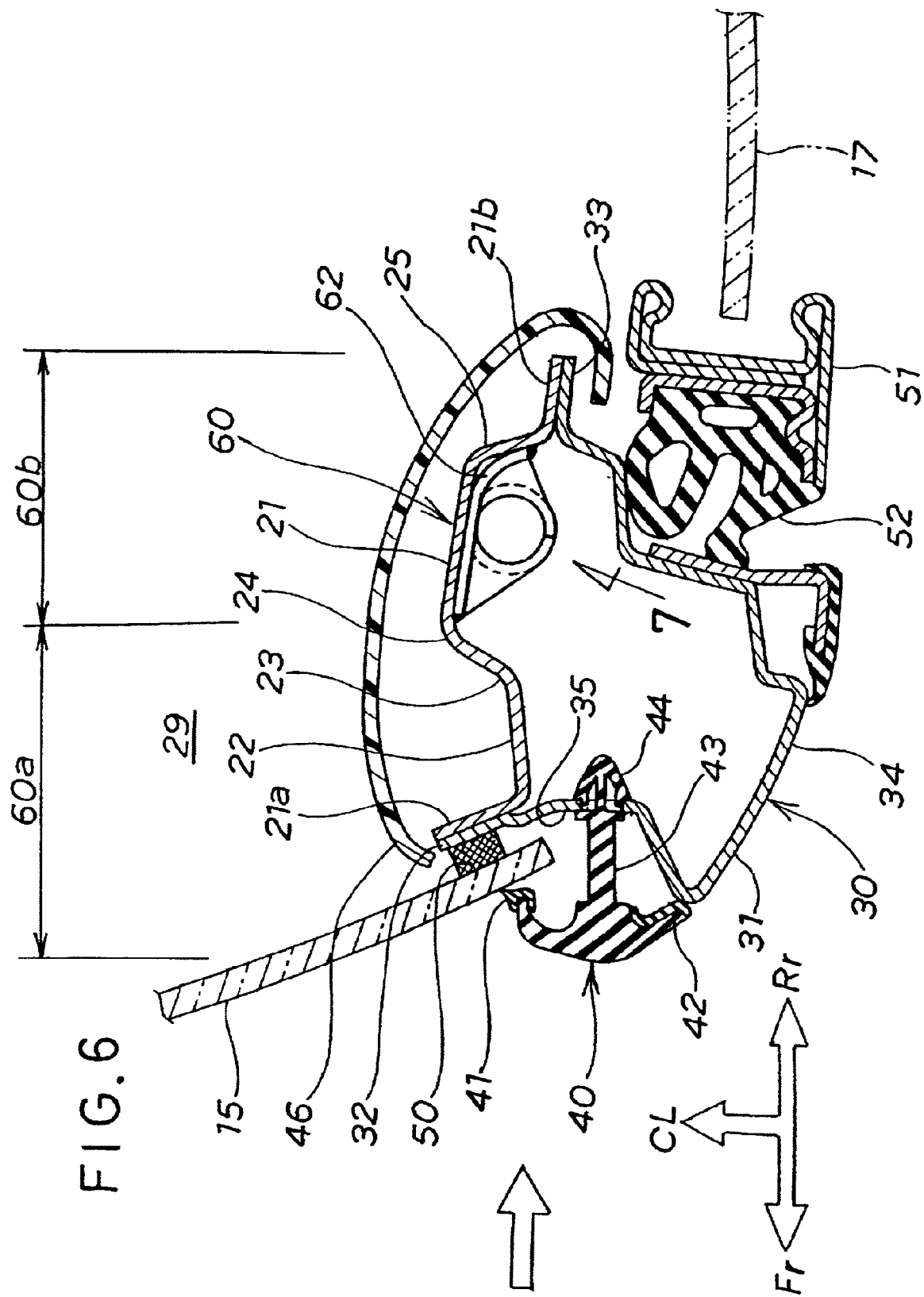
FIG. 6 is a sectional view of a front pillar in accordance with a second embodiment of the present invention.

FIG. 6 is a sectional view of a front pillar 60 (left front pillar) in accordance with the second embodiment of the present invention. The front pillar 60 includes inner and outer frame members 21 and 30 joined together into a substantial tubular shape. Fore portion of the inner frame member 21 has first and second bent portions 23 and 24 that together constitute a shock absorbing section 60a, and a rear portion 25 of the inner frame member 60 is reinforced with a reinforcing member or pipe 62 of a closed cross-sectional shape, so as to serve as a high-rigidity section 60b that affords the necessary rigidity or mechanical strength of the front pillar 60. The reinforcing pipe 62 generally has a circular cross-sectional shape.

Figure 7:
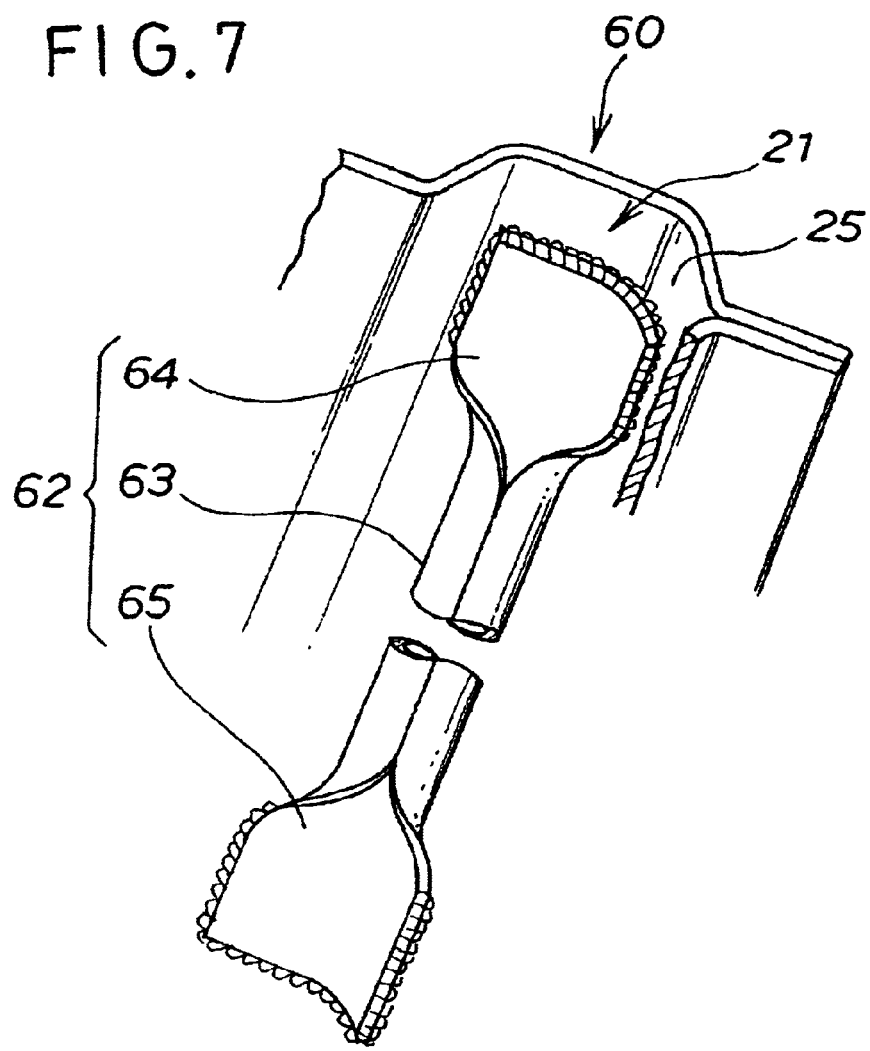
FIG. 7 is a view taken in a direction of arrow 7 of FIG. 6.

FIG. 7 is a view taken in a direction of arrow 7 of FIG. 6. The reinforcing pipe 62 is formed by pressing a flat plate in such a manner that it has a middle pipe-shaped middle portion 63 and upper and lower flat portions 64 and 65. The upper and lower flat portions 64 and 65 are welded at their outer edges to the rear portion 25 of the inner frame member 21, so as to reinforce the inner-frame rear portion 25. Importantly, the thus-welded upper and lower flat portions 64 and 65 of the reinforcing pipe 62 are kept in so-called "face-to-face contact" with the surface of the rear portion 25, so that any external stress applied to the rear portion 25 can be effectively dispersed widely. Even in the case where the reinforcing pipe 62 is welded directly to the rear portion 25 of a relatively small wall thickness, the face-to-face contact can reliably prevent the welded portion of the rear portion 25 from being cracked, as compared to a conventional vehicle front pillar shown in FIG. 8.

Figure 8:
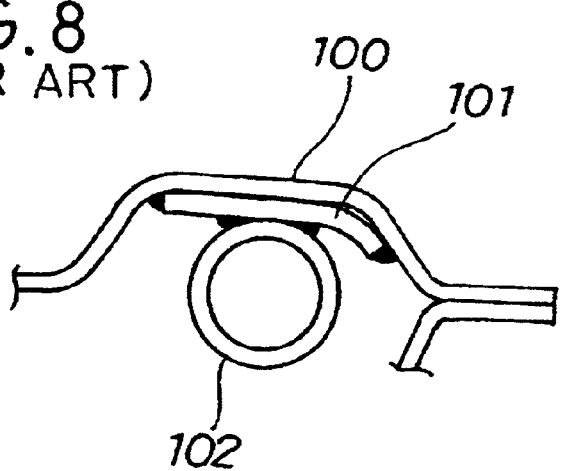
FIG. 8 is a sectional view of a conventional vehicle front pillar.

FIG. 8 is a sectional view of the conventional vehicle front pillar, where a reinforcing plate 101 of a relatively great thickness is welded to a rear portion 100 of an inner frame member and a reinforcing pipe 102 is welded to the outer surface of the reinforcing plate 101. In this case, the welded reinforcing pipe 102 is kept in so-called "line contact" with the rear portion 100 of the inner frame member, and thus an external stress would concentrate at the line contact. The stress concentration at the line contact tends to create an unwanted crack in the rear portion 100. In order to avoid the crack, it is necessary to weld the reinforcing plate 101 of a greater thickness to the rear portion 100 of the inner frame member and then weld the reinforcing pipe 102 to the thicker reinforcing plate 101. Because the provision of the thicker reinforcing plate 101 is essential, the conventional front pillar would increase the number of necessary component parts and also require an extra time and labor for welding the plate 101 to the rear portion 100.

In contrast to the conventional front pillar of FIG. 8, the reinforcing pipe 62 of the front pillar of the present invention can be welded directly to the rear portion 25 in the face-to-face contact therebetween, using the upper and lower flat portions 64 and 65. This arrangement can effectively reduce the number of necessary component parts as compared to the conventional front pillar and also eliminate the extra time and labor for welding a separate reinforcing plate.

The front pillar 60 in accordance with the second embodiment of the invention operates as follows. When an obstacle or external object collides with the garnish 40 of the front pillar 60 from ahead of the vehicle 10 as arrowed in FIG. 6, the shock absorbing section 60a can be greatly deformed plastically, with a substantial cushion effect, toward the interior of the passenger compartment 29, as in the above-described first embodiment (front pillar 20).

Thus, the front pillar 60 can sufficiently absorb the colliding impact force and thereby sufficiently alleviate the impact on the external object. In addition, the high-rigidity section 20b of the front pillar 60, which is reinforced with the reinforcing pipe 62 of the closed sectional structure, can still retain the necessary rigidity of the rear portion 25 of the inner frame member despite the collision, and thus prevent unwanted deformation of the passenger compartment 29.

Figure 9:
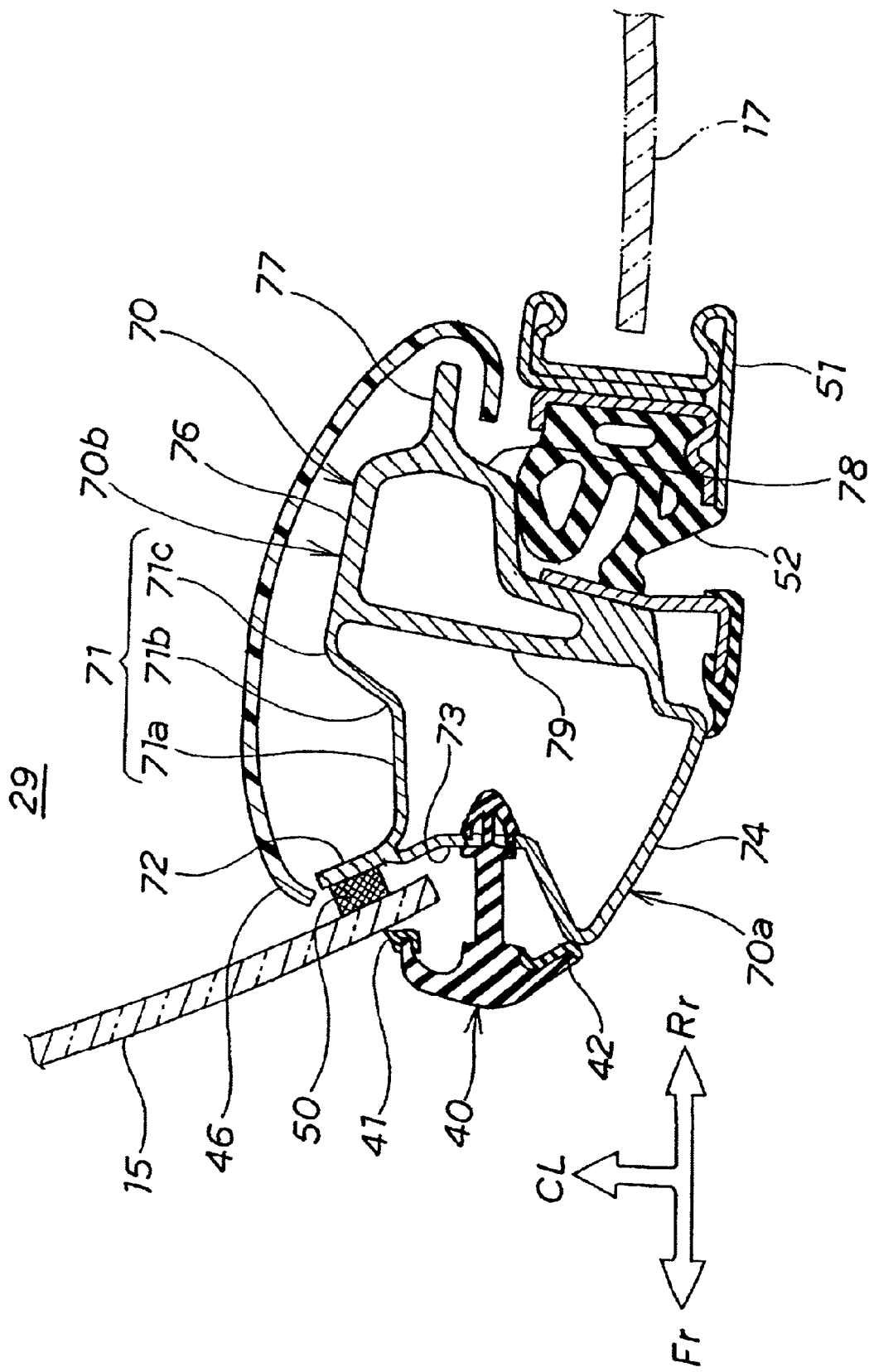
FIG. 9 is a sectional view of a front pillar in accordance with a third embodiment of the present invention.

FIG. 9 is a sectional view of a front pillar 70 (left front pillar) in accordance with the third embodiment of the present invention. The front pillar 70 has a substantial tubular shape, and a fore half portion of the front pillar 70 is oriented in the forward direction of the vehicle 10 while a rear half portion of the front pillar 70 is oriented in the rearward direction of the vehicle 10. The fore half portion of the front pillar 70 is formed to have a small wall thickness so as to serve as a shock absorbing section 70a that absorbs an impact force applied from ahead of the vehicle. The rear half portion, on the other hand, is formed into a closed sectional structure of a great wall thickness so as to serve as a high-rigidity section 70b that retains the necessary rigidity of the front pillar 70. It is preferred that the front pillar 70 be integrally formed by extruding a metal material such as steel or aluminum alloy.

The shock absorbing section 70a has an inner thin wall portion 71 extending forward from the fore end of the high-rigidity section 70b, and a fore flange portion 72 extending forward from the fore end of the inner thin wall portion 71 substantially in parallel to a front windshield glass 15. The shock absorbing section 70a also has a fore thin wall portion 73 running outward (i.e., away from the interior of the vehicle) from the fore flange portion 72, and an outer thin wall portion 74 running between the fore thin wall portion 73 and the high-rigidity section 70b provided rearwardly of the shock absorbing section 70a. The inner thin wall portion 71 has first and second bent portions 71b and 71c formed by forming an outward bulge 71a.

Namely, the fore half portion of the front pillar 70 can be made to serve as the shock absorbing section 70a, by forming the fore half portion into a thin wall structure and forming the first and second bent portions 71b and 71c. Thus, in case an obstacle or external object collides with the front pillar 70 from ahead of the vehicle 10, the first and second bent portions 71b and 71c can be deformed relatively easily, with a substantial cushion effect, by the colliding impact force. As a consequence, the colliding impact force can be absorbed effectively, and the impact on the external object can be alleviated to a sufficient degree.

The high-rigidity section 70b has an inner thick wall portion 76 running rearwardly from the rear end of the inner thin wall portion 71, a rear flange portion 77 extending forward from the rear end of the inner thick wall portion 76 substantially in parallel to the door glass 17. The high-rigidity section 70b also has an outer thick wall portion 78 running outward (i.e., away from the interior of the vehicle) from the rear flange portion 77, and a thick partition portion 79. With these wall portions, the high-rigidity section 70b is formed into the closed sectional structure.

The high-rigidity section 70b, thus formed into the closed sectional structure of a great wall thickness, can enhance the rigidity of the front pillar 70 without requiring a separate reinforcing member welded to the inner frame member as in the first and second embodiments. Thus, it is possible to reduce the total number of necessary component parts constituting the front pillar 70. Further, because the operations for welding the reinforcing member are not necessary, the front pillar 70 can be manufactured without requiring a long time. Furthermore, the high-rigidity section 70b, thus formed into the closed sectional structure of a great wall thickness, can be prevented from being deformed by an external object colliding with the front pillar 70; thus, the passenger compartment 29 can retain its original shape despite the collision of the external object with the front pillar 70.

Figure 10A:
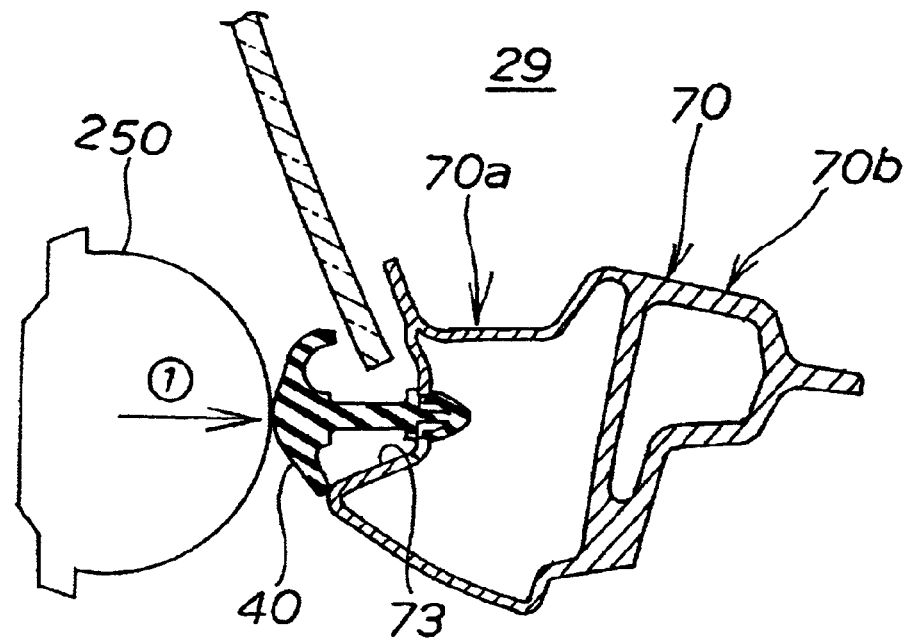
FIGS. 10A and 10B are views explanatory of how the vehicle front pillar in accordance with the third embodiment operates.
Figure 10B:
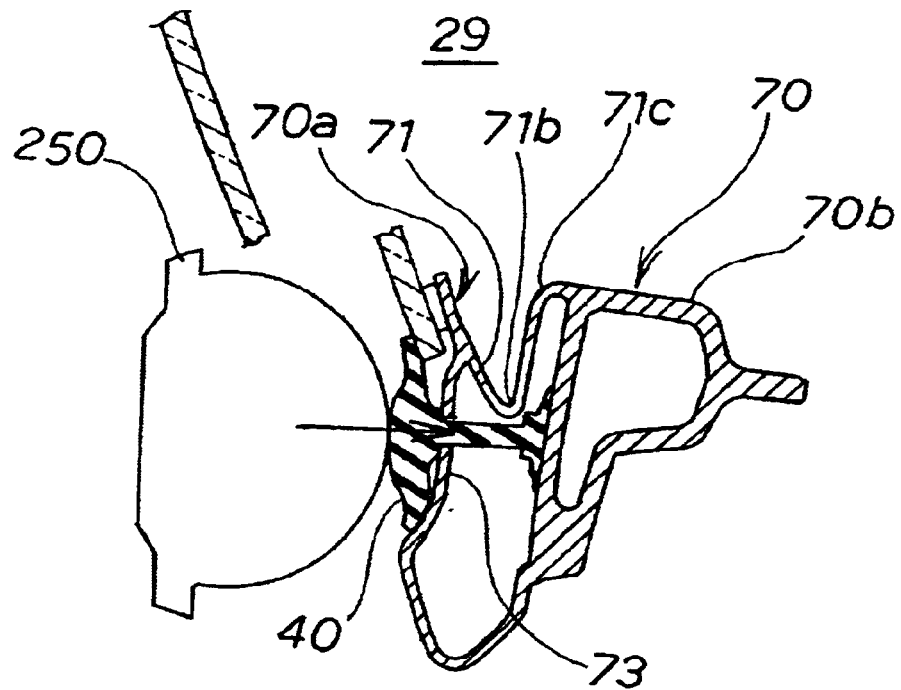

FIGS. 10A and 10B are views explanatory of operation of the vehicle front pillar 70 in accordance with the third embodiment. More specifically, FIG. 10A shows an obstacle or external object 250 colliding with the garnish 40 from ahead of the vehicle as denoted by arrow ①. FIG. 4B shows a next state of the collision, in which the garnish 40 having collided with the external object 250 is strongly pressed rearward and crushed by the external object 250 so that the garnish 40 is forced into a recess defined by the fore thin wall portion 73. Then, the first and second bent portions 71b and 71c of the inner thin wall portion 71 are further bent by the colliding impact force so that the shock-absorbing section 70a of the front pillar 70 is greatly deformed plastically, with a cushion effect, toward the interior of the passenger compartment 29. By the above-described construction and operation, the front pillar 70 can sufficiently absorb the colliding impact force and thereby sufficiently alleviate the impact on the external object 250. In addition, the high-rigidity section 70b can still retain the necessary rigidity despite the colliding impact, and thus prevent unwanted deformation of the passenger compartment 29.

Whereas the first and second embodiments of the present invention have been described above as forming the first and second bent portions 23 and 24 by curving or bulging the fore portion 22 of the inner frame member outwardly away from the interior of the vehicle 10, the first and second bent portions 23 and 24 may be formed by curving the fore portion 22 inwardly toward the interior of the vehicle 10. Further, although the garnish 40 has been described as being formed of resin, such as polyvinyl chloride, the garnish 40 may be formed of any other suitable material, as long as it can be deformed by an obstacle or external object colliding with the front pillar to effectively absorb the colliding impact force.

Furthermore, the third embodiment has been described as integrally forming the front pillar 70 by extrusion; however, the shock-absorbing section 70a and high-rigidity section 70b may be first formed separately by extrusion and then welded together. Moreover, whereas the first and second bent portions 71b and 71c in the third embodiment have been described as being formed on the inner thin wall portion 71, such bent portions may not be formed on any other suitable position than the inner thin wall portion 71. Further, the number of the bent portions may be smaller or greater than two, as long as the bent portion or portions can function as an effective shock absorbing function.

Figure 11:
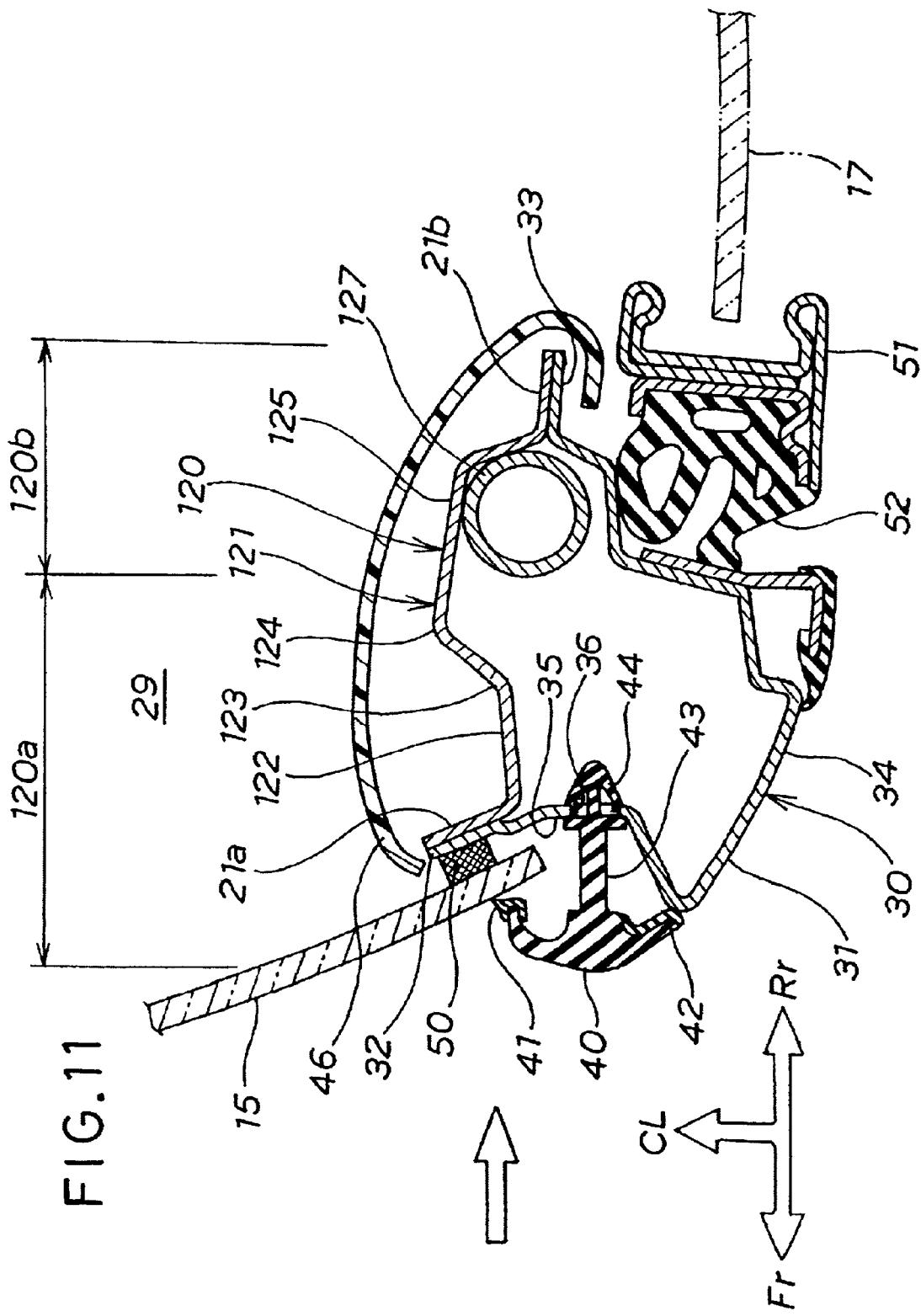
FIG. 11 is a cross-sectional view similar to FIG. 2, which shows a front pillar in accordance with a fourth embodiment of the present invention.

FIG. 11 is a cross-sectional view similar to FIG. 2, which shows a front pillar 120 in accordance with a fourth embodiment of the present invention. In FIG. 11, elements having the same functions as those in FIG. 2 are represented by the same reference numerals and will not be described in detail to avoid unnecessary duplication. Fore half portion of the front pillar 120 is oriented in the forward direction of the vehicle 10, while a rear half portion of the front pillar 120 is oriented in the rearward direction of the vehicle 120. As shown, a fore portion 122 of the inner frame member 121 has first and second bent portions 123 and 124 that together constitute a shock absorbing section 120a, and a rear portion 125 of the inner frame member 121 is reinforced with a reinforcing pipe 127 of a closed, i.e. circular, cross-sectional shape, so as to serve as a high-rigidity section 120b that affords the necessary rigidity or mechanical strength of the front pillar 120. The reinforcing pipe 127 is secured to the surface of the rear portion 125 of the inner frame member 121. It is preferred that the inner frame member 121 be formed by bending or extruding a metal material such as steel or aluminum alloy.

In case an obstacle or external object collides with the front pillar 120 from ahead of the vehicle 10, the inner-frame fore portion 122 can be deformed, with a substantial cushion effect, with the first and second bent portions 123 and 124, constituting the shock absorbing section 120a on the fore portion 122 of the front pillar 120, further bent by the colliding impact force. Such cushioning deformation of the inner-frame fore portion 122 can effectively absorb the colliding impact force and thereby alleviate the impact on the external object.

Further, because the deformation of the fore portion 122 can be promoted by just forming the first and second bent portions 123 and 124 on the fore portion 122 of the front pillar 120, the shock-absorbing front pillar 120 can be produced relatively easily.

Furthermore, with the rear portion 125 of the inner frame member 121 reinforced with the reinforcing pipe 127 having the closed cross-sectional shape, the rear portion 125 of the inner frame member 121 can serve as the high-rigidity section 120b. Thus, when an obstacle or external object collides against with the front pillar 120, the front pillar 120 can effectively prevent the rear portion 125 of the inner frame member 121 from being deformed by the colliding impact and thereby retain the shape of the passenger compartment 29.

Figure 12:
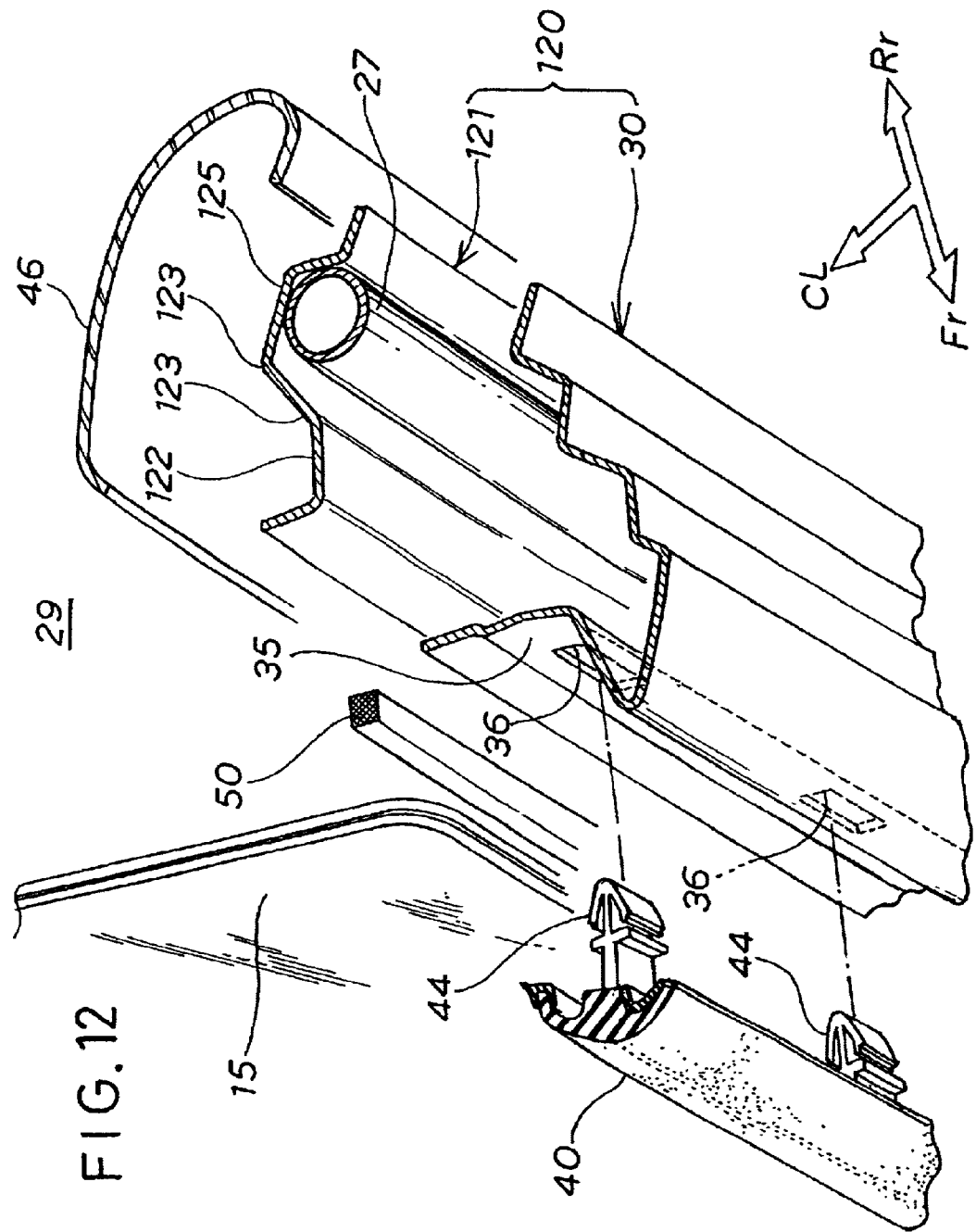
FIG. 12 is an exploded perspective view of the front pillar shown in FIG. 11.

FIG. 12 is an exploded perspective view of the front pillar 120 shown in FIG. 11. From the figure, it should be clearly seen that the inner frame member 121 is an elongate member that is curved outwardly to have the first and second bent portions 123 and 124 formed on the fore portion 122 and the reinforcing pipe 127 is also an elongate member secured to the rear portion 125 of the inner frame member 121.

It should also be obvious that the front pillar 120 of FIG. 11 operates substantially in the same manner as the first embodiment of FIG. 2 (i.e., as illustrated in FIGS. 4A and 4B), and thus description and illustration of the operation of the front pillar 120 are omitted here to avoid unnecessary duplication. By such construction and operation, the front pillar 120 can sufficiently absorb the colliding impact force and thereby sufficiently alleviate the impact on the external object 250. In addition, the high-rigidity section 120b of the front pillar 120 can still retain the necessary rigidity of the rear portion 125 of the inner frame member 121 despite the colliding impact, and thus prevent unwanted deformation of the passenger compartment 29.

Figure 13:
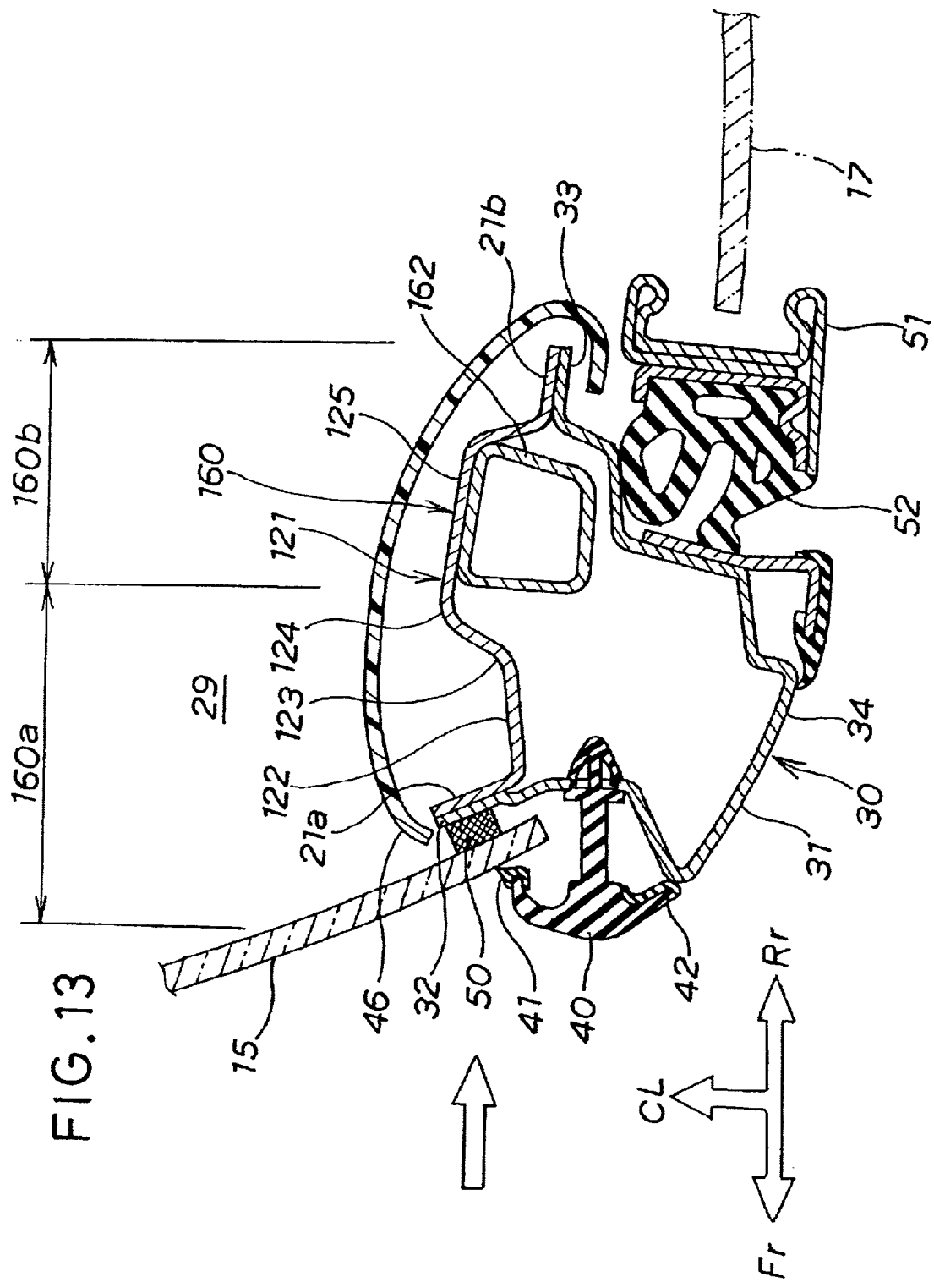
FIG. 13 is a cross-sectional view similar to FIG. 11, which shows a front pillar in accordance with a fifth embodiment of the present invention.
Figure 14:
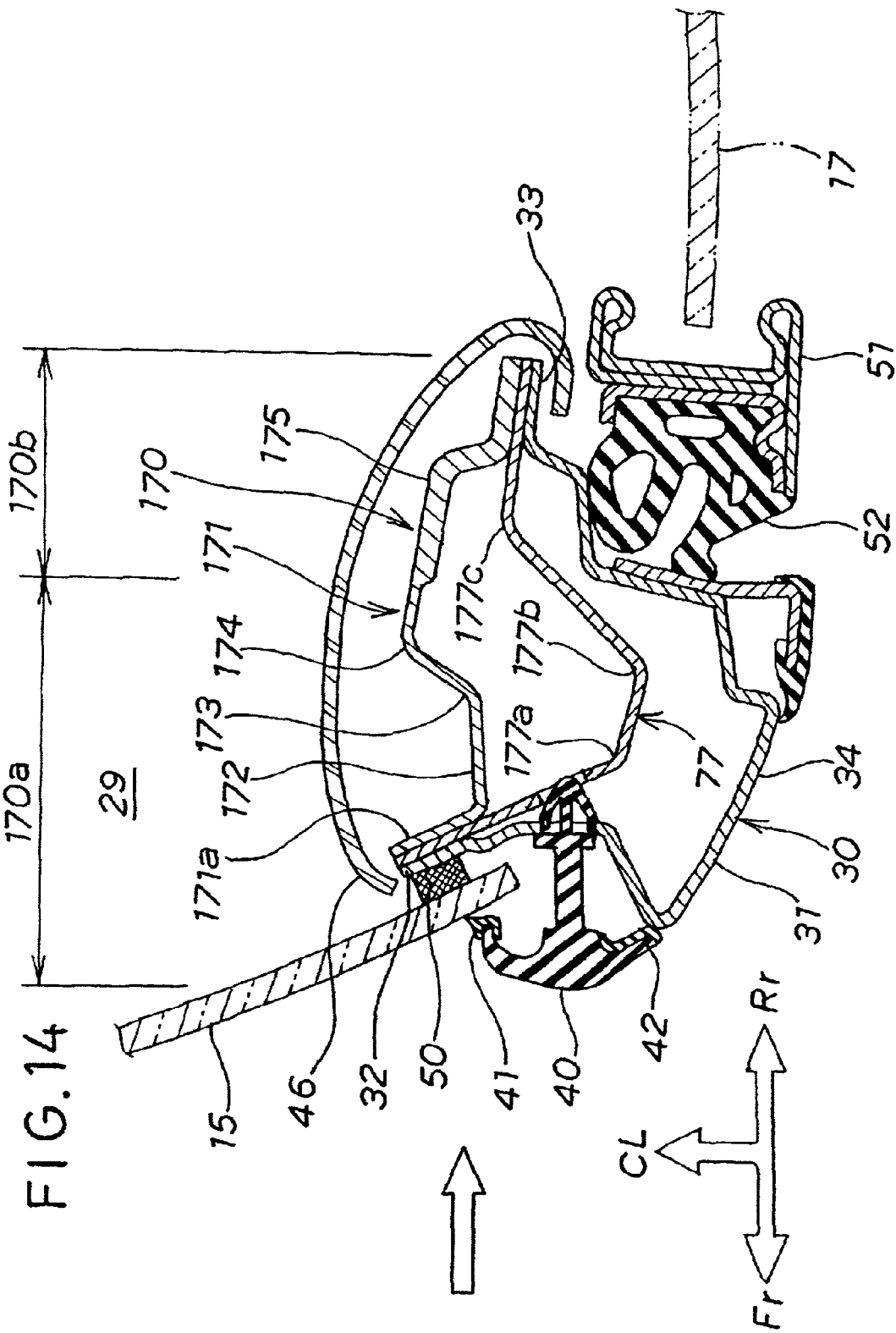
FIG. 14 is a cross-sectional view generally similar to FIG. 11, which shows a front pillar in accordance with a sixth embodiment of the present invention.

Further, FIGS. 13 and 14 are cross-sectional views similar to FIG. 2 or 11, which show front pillars 160 and 170 in accordance with fifth and sixth embodiments of the present invention, respectively. In FIGS. 13 and 14, elements having the same functions as those in FIG. 11 are represented by the same reference numerals and will not be described in detail to avoid unnecessary duplication.

The front pillar 160 of FIG. 13 includes inner and outer frame members 121 and 30 joined together into a substantial tubular shape. Fore half portion of the front pillar 160 is oriented in the forward direction of the vehicle 10, while a rear half portion of the front pillar 160 is oriented in the rearward direction of the vehicle 10. As shown, a fore portion 122 of the inner frame member 121 has first and second bent portions 123 and 124 that together constitute a shock absorbing section 160a, and a rear portion 125 of the inner frame member 121 is reinforced with a reinforcing pipe 162 of a closed cross-sectional shape, so as to serve as a high-rigidity section 160b that affords the necessary rigidity or mechanical strength of the front pillar 160. More specifically, the reinforcing pipe 162 in this embodiment has a rectangular cross-sectional shape.

Namely, the front pillar 160 according to the fifth embodiment is different from the front pillar 120 according to the fourth embodiment in that the reinforcing pipe 162 has the rectangular cross-sectional shape rather than the circular cross-sectional shape. Because of the rectangular cross-sectional shape, the reinforcing pipe 162 of FIG. 13 can be fixed in "face-to-face contact" with the surface of the rear portion 125, so that a greater contact area is provided between the reinforcing pipe 162 and the rear portion 125 and an external stress applied to the rear portion 125 can be effectively dispersed widely. As a consequence, it is possible to reliably prevent damage or breakage of the inner-frame rear portion 125 due to stress concentration thereon and thereby enhance the reliability of the front pillar 160.

The front pillar 160 in accordance with the fifth embodiment of the invention operates as follows. When an obstacle or external object collides with the garnish 40 of the front pillar 160 from ahead of the vehicle 10 as arrowed in FIG. 13, the shock absorbing section 160a of the inner-frame fore portion can be greatly deformed plastically, with a substantial cushion effect, toward the interior of the passenger compartment 29, as in the above-described fourth embodiment (front pillar 120). Thus, the front pillar 160 of FIG. 13 can sufficiently absorb the colliding impact force and thereby sufficiently alleviate the impact on the external object. In addition, the high-rigidity section 160b of the front pillar 160, which is reinforced with the reinforcing pipe 162, can still retain the necessary rigidity of the rear portion 125 of the inner frame member despite the collision, and thus prevent unwanted deformation of the passenger compartment 29.

Further, in FIG. 14, the front pillar 170 according to the sixth embodiment of the present invention includes inner and outer frame members 171 and 30 joined together into a substantial tubular shape, and a fore half portion of the front pillar 170 is oriented in the forward direction of the vehicle 10 while a rear half portion of the front pillar 170 is oriented in the rearward direction of the vehicle 10. The inner-frame fore portion 172 has first and second bent portions 173 and 174 to serve as a shock absorbing section 170a for absorbing an impact force applied from ahead of the vehicle. The inner-frame rear portion 175, on the other hand, is formed into a great wall thickness so as to serve as a high-rigidity section 170b that retains the necessary rigidity of the front pillar 170.

The front pillar 170 of FIG. 14 also includes an interior reinforcing stiffener 177 fixed between the inner and outer frame members 171 and 30, i.e. within the front pillar 170, and extending between the fore and rear ends of the inner and outer frame member 171 and 30. The interior reinforcing stiffener 177 is curved to have first, second and third bent portions 177a, 177b and 177c. Namely, the front pillar 170 is different from the fourth embodiment (front pillar 120) in that the inner-frame rear portion 175 is formed into a greater wall thickness so as to provide the high-rigidity section 170b and the front pillar 170 includes the interior reinforcing stiffener 177. According to the sixth embodiment of FIG. 14, there is no need to attach a separate reinforcing pipe to the high-rigidity section 170b, so that it is possible to reduce the total number of necessary component parts and also eliminate the extra time and labor for welding the separate reinforcing pipe.

When an obstacle or external object collides with the garnish 40 of the front pillar 170 from ahead of the vehicle as arrowed in FIG. 14, the front pillar 170 collapses with further bending of the first and second bent portions 173 and 174 of the inner-frame fore portion 172 and the additional first to third bent portions 177a, 177b and 177c of the stiffener 177. Thus, the shock absorbing section 160a can be greatly deformed plastically, with a greater cushion effect, toward the interior of the passenger compartment 29, as in the above-described fourth embodiment (front pillar 120). As a consequence, the front pillar 170 can sufficiently absorb the colliding impact force and thereby sufficiently alleviate the impact on the external object. In addition, the high-rigidity section 170b of the front pillar 170, which is provided by forming the inner-frame rear portion 175 into a greater wall thickness, can still retain the necessary rigidity of the rear portion 175 of the inner frame member despite the collision, and thus prevent unwanted deformation of the passenger compartment 29.

Whereas the fourth to sixth embodiments of the present invention have been described as forming the first and second bent portions of the inner-frame fore portion by curving the fore portion outwardly away from the interior of the vehicle, these first and second bent portions may be formed by curving the inner-frame fore portion inwardly toward the interior of the vehicle. Further, whereas the inner-frame rear portion has been described above as reinforced with a reinforcing pipe or reinforced by being formed into a great wall thickness, it may be reinforced in any other suitable manner.

In summary, according to one aspect of the present invention, the fore half portion of the front pillar has at least one bent portion to serve as a shock absorbing section of the vehicle front pillar. Thus, in case an obstacle or external object collides with the front pillar, the fore half portion of the front pillar can be deformed, with a substantial cushion effect, with the bent portion further bent by the colliding impact force. Such cushioning deformation of the fore half portion can effectively absorb the colliding impact force and thereby alleviate the impact on the external object. Further, with the reinforcing member of the closed sectional structure attached to the rear portion of the front pillar, the rear half portion can serve as a high-rigidity section for retaining the rigidity of the front pillar. Thus, when an obstacle or external object collides against with the front pillar, the rear half portion can be prevented from being deformed by the colliding impact and thereby can retain the shape of the passenger compartment despite the collision. As a consequence, the present invention can sufficiently alleviate the impact on the external object while still retaining the necessary rigidity of the front pillar.

According to another aspect of the present invention, the fore half portion of the front pillar is formed into a thin wall structure so as serve as a shock absorbing section of the vehicle front pillar. When an obstacle or external object collides against with the front pillar, the fore half portion of the front pillar can be deformed with the thin wall structure bent by the colliding impact force. Such cushioning deformation of the fore portion can effectively absorb the colliding impact to thereby alleviate the impact on the external object. Further, by forming the rear portion of the front pillar formed into a thick-wall closed sectional structure, the rear portion can serve as a high-rigidity section of the vehicle front pillar. Thus, when an obstacle or external object collides against with the front pillar, the rear portion can be prevented from being deformed by the colliding impact and thereby can retain the shape of the passenger compartment despite the collision. As a consequence, the present invention can sufficiently alleviate the impact on the external object while still retaining the necessary rigidity of the front pillar.

What is claimed is:

1. A vehicle front pillar comprising:
   a fore half portion oriented toward a front of the vehicle and having at least one bent portion formed thereon so as to serve as a shock absorbing section of said vehicle front pillar; and
   a rear half portion oriented toward a back of the vehicle and having a reinforcing member of a closed sectional structure attached thereto so as to serve as a high-rigidity section of said vehicle front pillar,
   wherein said at least one bent portion is spaced forward from said reinforcing member in a longitudinal direction of the vehicle, and during collision, said fore half portion is deformed and said at least one bent portion is further bent by an impact force of the collision to thereby absorb the impact force, and wherein the reinforcing member does not extend substantially along the fore half portion.

2. A vehicle front pillar as claimed in claim 1 wherein said reinforcing member has a rectangular cross-sectional shape.

3. A vehicle front pillar as claimed in claim 1 wherein said fore half portion and said rear half portion are disposed on a single elongate member.

4. A vehicle front pillar as claimed in claim 1 wherein said at least one bent portion extends from said reinforcing member to a windshield of the vehicle.

5. A vehicle front pillar as claimed in claim 1 wherein said at least one bent portion extends between an end of said reinforcing member and the front of the vehicle.

6. A vehicle front pillar as claimed in claim 1, further comprising an inner frame member and an outer frame member joined with the inner frame member so as to form a substantial tubular shape of the vehicle front pillar, wherein said inner frame member is facing a passenger compartment of the vehicle and said fore half portion is formed on said inner frame member and, said at least one bent portion being formed on said fore half portion of the inner frame member, said fore half portion having said at least one bent portion constituting the shock absorbing section of said vehicle front pillar.

7. A vehicle front pillar as claimed in claim 6, wherein said fore half portion of the inner frame member is curved outwardly away from the passenger compartment so as to form said at least one bent portion.

8. A vehicle front pillar as claimed in claim 6, wherein said rear half portion is formed on said inner frame member and extends rearward from a rear end of the fore half portion and is reinforced with said reinforcing member.

9. A vehicle front pillar as claimed in claim 8, wherein said reinforcing member has a portion secured between said inner and outer frame members at a rear end of said vehicle front pillar.

10. A vehicle front pillar of a substantial tubular shape comprising:

a fore half portion oriented toward a front of the vehicle and having at least one bent portion formed thereon so as to as a shock absorbing section of said vehicle front pillar; and a rear half portion oriented toward a back of the vehicle and having a reinforcing member of a closed sectional structure attached thereto so as to serve as a high-rigidity section of said vehicle front pillar, wherein said at least one bent portion is spaced forward from said reinforcing member in a longitudinal direction of the vehicle, and during collision, said fore half portion is deformed and said at least one bent portion is further bent by an impact force of the collision to thereby absorb the impact force, wherein said at least one bent portion comprises a first bent portion and a second bent portion, and wherein the reinforcing member does not extend substantially along the fore half portion.

11. A vehicle front pillar as claimed in claim 1, further comprising:

an inner frame member and an outer frame member joined with the inner frame member so as to form a substantially tubular shape, wherein the inner frame member is facing a passenger compartment of the vehicle and has a fore flange portion and a fore portion extending rearward from the fore flange portion, the outer frame member has a fore flange portion joined with the fore flange portion of the inner frame member, the fore flange portion and the fore portion of the inner frame member form the fore half portion of the vehicle front pillar, and the at least one bent portion constituting the shock absorbing section of the vehicle front pillar is formed on the fore portion of the inner frame member and spaced rearward from the fore flange portion in the longitudinal direction of the vehicle.

12. A vehicle front pillar as claimed in claim 11, wherein the fore portion of the inner frame member is curved outwardly away from the passenger compartment so as to form the at least one bent portion.

13. A vehicle front pillar as claimed in claim 12, wherein the at least one bent portion comprises a first bent portion and a second bent portion.

14. A vehicle front pillar as claimed in claim 11, wherein the inner frame member further has a rear portion extending rearward from a rear end of the fore portion and a rear flange portion extending from a rear end of the rear portion, the outer frame member further has a rear flange portion joined with the rear flange portion of the inner frame member, the rear portion and the rear flange portion of the inner frame member form the rear half portion of the vehicle front pillar, and the reinforcement member is attached to the rear portion of the inner frame member.

15. A vehicle front pillar as claimed in claim 14, wherein the fore portion of the inner frame member is curved outwardly away from the passenger compartment so as to form the as least one bent portion.

16. A vehicle front pillar as claimed in claim 15, wherein the at least one bent portion comprises a first bent portion and a second bent portion.

17. A vehicle front pillar as claimed in claim 14, wherein the reinforcing member has a portion secured between the rear flange portions of the front and rear frame members.

18. A vehicle front pillar as claimed in claim 15, wherein the reinforcing members has a portion secured between the rear flange portions of the front and rear frame members.

19. A vehicle front pillar as claimed in claim 16, wherein the reinforcing member has a portion secured between the rear flange portions of the front and rear frame members.

* * * * *